Figure 1:
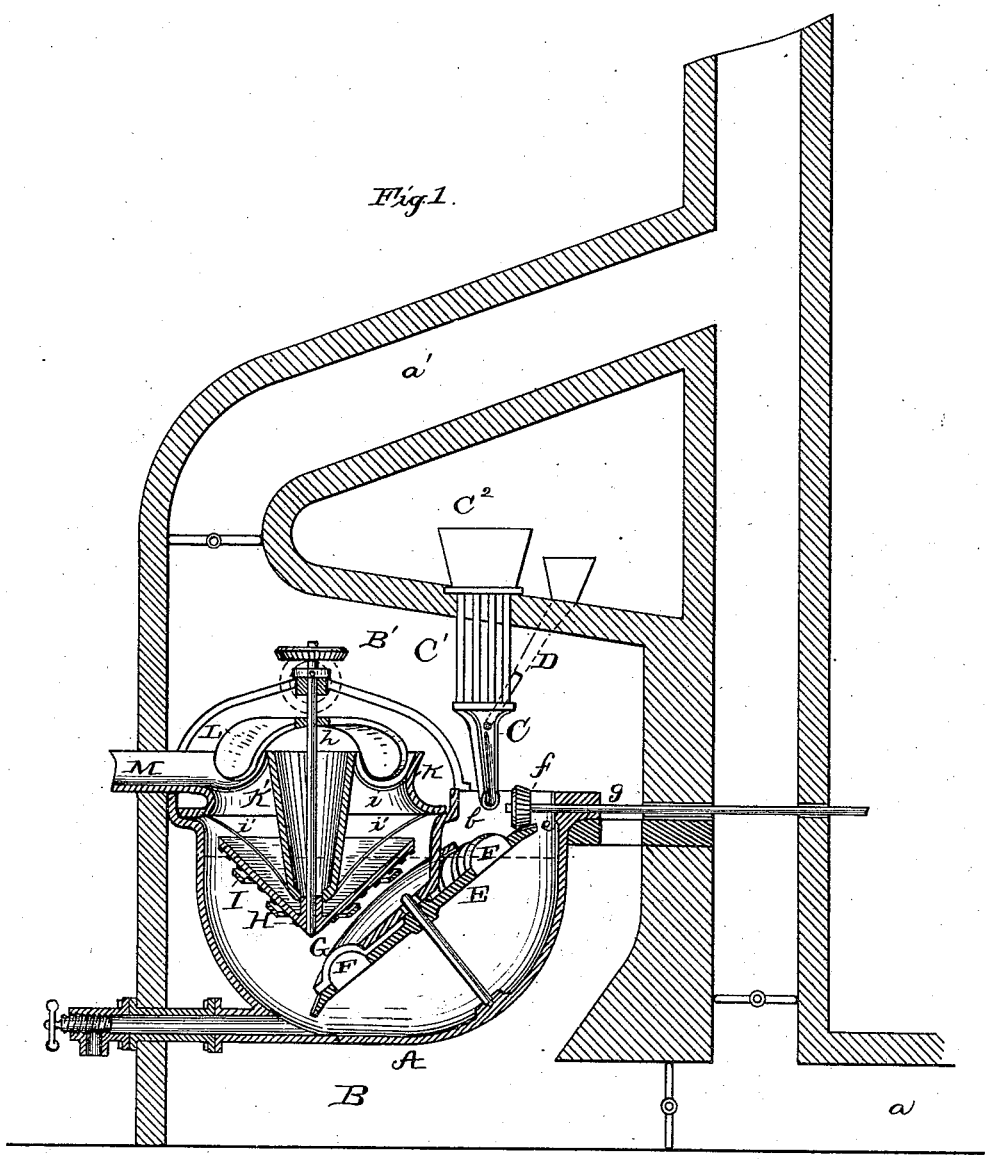

(No Model.) 3 Sheets—Sheet 1.

J. L. HORNIG.
METAL EXTRACTING APPARATUS.

No. 306,831. Patented Oct. 21, 1884.

ATTEST:
E. Rowland
H. W. Seeley

INVENTOR:
Julius L. Hornig,
By Rich.d N. Dyer,
Atty.

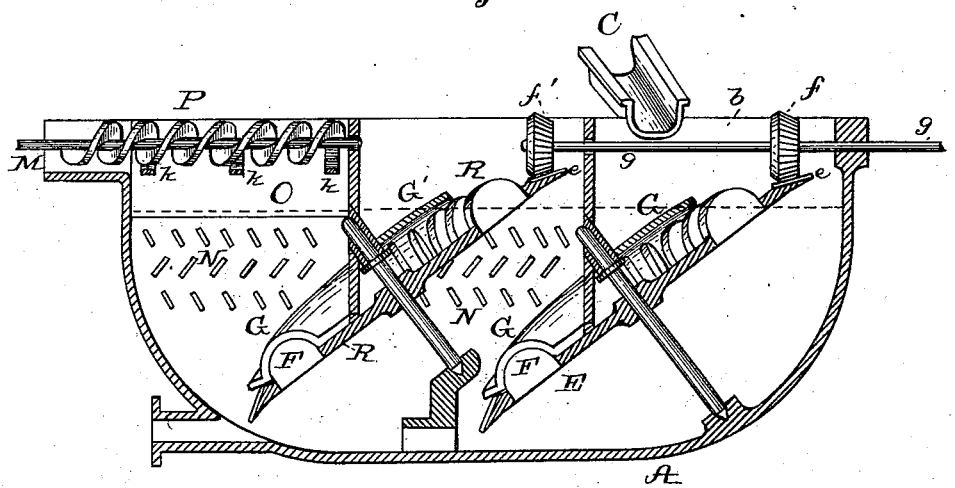
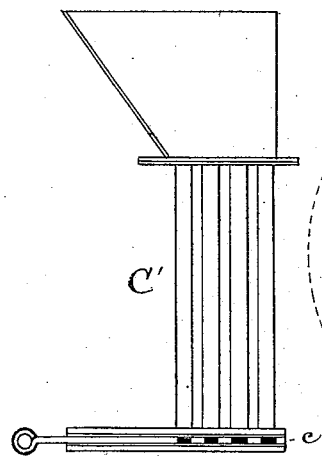
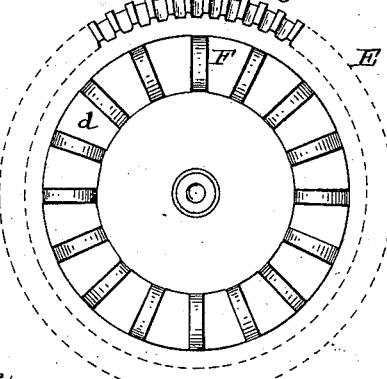
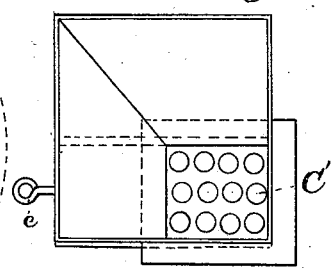

(No Model.) 3 Sheets—Sheet 3.
J. L. HORNIG.
METAL EXTRACTING APPARATUS.
No. 306,831. Patented Oct. 21, 1884.
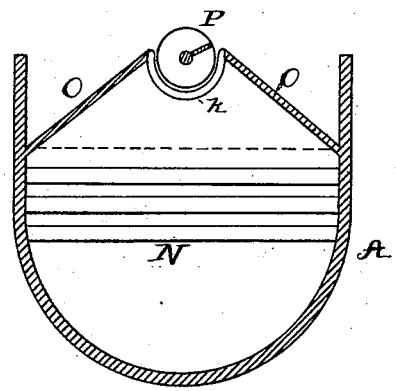
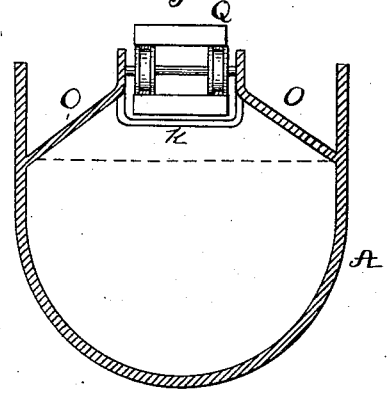 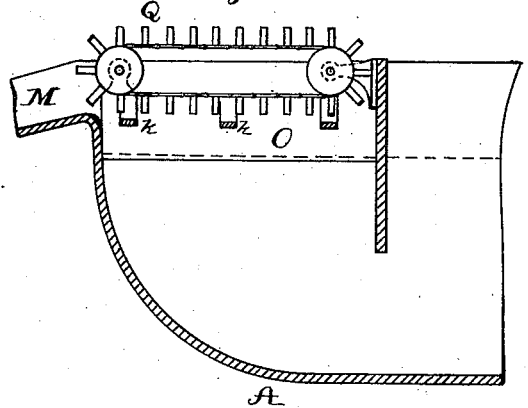
ATTEST:
E. C. Rowland
N. W. Levy
INVENTOR:
Julius L. Hornig,
By Rich N. Dyer
Atty.

UNITED STATES PATENT OFFICE.

JULIUS L. HORNIG, OF JERSEY CITY, NEW JERSEY, ASSIGNOR TO THE HAMILTON LEAD BATH COMPANY, OF NEW YORK, N. Y.

METAL-EXTRACTING APPARATUS.

SPECIFICATION forming part of Letters Patent No. 306,831, dated October 21, 1884.

Application filed January 19, 1884. (No model.)

*To all whom it may concern:*

Be it known that I, JULIUS L. HORNIG, of Jersey City, in the county of Hudson and State of New Jersey, have invented a certain new and useful Improvement in Metal-Extracting Apparatus, of which the following is a specification.

My invention relates to apparatus for the extraction of the precious metals by the process of alloying with lead, but is also applicable to apparatus for the extraction of the precious metals by amalgamation with mercury, and generally to the extraction and separation of materials by immersion in liquid having a greater specific gravity than the material acted upon.

The invention consists in the peculiar means for forcing the material to the bottom of the body of liquid; for separating and distributing it as it rises, and for discharging the refuse.

In the accompanying drawings, forming a part hereof, Figure 1 is a vertical section of extracting apparatus, showing for clearness of illustration only one set of devices for treating the material; Fig. 2, a vertical section of the kettle and the devices located therein, showing two sets of immersing and distributing devices for repeating the treatment of the material; Fig. 3, a separate view of the wheel carrying the scrapers; Figs. 4 and 5, views of the heating-feeder, and Figs. 6, 7, and 8 views of modified forms of the discharging device.

Like letters denote corresponding parts in all the figures.

The vessel or kettle A of the apparatus is of any ordinary or suitable form, and is located within the walls of a suitable inclosing-furnace. The furnace is divided into two parts by the kettle, the space B below it being a fire-box, or communicating by a flue, $a$, with a separate fire-box. The products of combustion rise around the kettle and pass through openings provided for that purpose into the chamber B', above the kettle, which is connected by a flue, $a'$, with the stack. Suitable dampers are also employed, as shown. The kettle at one end has a receiving-chamber, $b$, where the material to be acted upon is supplied to the kettle by a delivery-spout, C, the flow of material from which is regulated in quantity or wholly stopped by a suitable valve, $c$. Above the delivery-spout C, within the chamber B', is a heater composed of a group of pipes, C', connected with the spout C, and with a receiving-hopper, C², located outside of the chamber B'. The ore-pulp to be acted on is thrown into the hopper C², and is fed downwardly by gravity, filling the pipes C'. The products of combustion circulate around and between the pipes C', and heat the ore-pulp up to the same or nearly the same temperature as the molten lead in the kettle. The group of pipes forms an efficient device for this purpose.

D is an auxiliary spout for furnishing charcoal-dust, to be incorporated with the ore before immersion in the molten lead; but this auxiliary spout forms no part of my present invention.

The device for delivering the material below the body of liquid (the height of which is indicated by the dotted line in Figs. 1 and 2) consists of a revolving wheel or plate, E, placed at an inclination, and carrying scrapers F, which bear against a scraping-surface, G, in the form of a curved trough. The wheel and scrapers are lighter than the liquid by being made of a material of less specific gravity than the liquid, or by being made hollow or filled with a material lighter than the liquid, and the bearings of the wheel permit sufficient movement, so that the buoyancy of the wheel keeps the scrapers in close contact with the trough. There are openings $d$ through the wheel between the scrapers, so that the material can readily escape and rise upwardly upon the lead from the bottom of the kettle after it passes the lower end of the trough.

For revolving the scraping-wheel, it may have a gear, $e$, on its periphery, with which engages a cog-wheel, $f$, on a shaft, $g$, operated by a suitable connection with the power. The wheel having the openings $d$ between the scrapers, the ore is held up by the lead as it passes under the trough, and after passing the lower end of the trough is immediately carried up by the lead to the surface. Thus no devices are required for scraping the ore out from the pockets in the wheel, as has heretofore been necessary. When the material escapes from the lower end of the trough, it rises into a space increasing regularly in an upward direction. In this space is located an inverted cone, H, mounted on a shaft, h, and revolved by power suitably applied to said shaft. The material rises against the inverted cone and strikes the same at its apex, and is separated and distributed by it, such material rising along the surface of the inverted cone to its broad end or base, around the edge of which it passes to the surface of the liquid above said cone.

Heretofore in apparatus of this character the material has been made to rise through narrow spaces between grinding-surfaces placed together and usually of irregular shape, so that the material is continually deflected around angles and moved through alternately contracted and expanding spaces. This results in the clogging of the material. With my construction, however, the distributing-surface is one increasing continually in the direction of the movement of the material to the point of discharge, and I have no opposing grinding-surfaces forming narrow passages, the cone or distributing surface having a free space surrounding it. The material is thus gradually distributed until it reaches the discharge, and has no opportunity for clogging.

To secure a better distribution or scattering of the material as it rises, the surface of the cone is preferably roughened or provided with projections which serve to divide the material. A series of stationary annular plates, I, or cone-sections is supported from the tank near the surface of the revolving cone, or a series of obliquely-arranged cross plates or bars is secured to the kettle to separate, distribute, and divert the material while rising through the heavier liquid. Above the cone H is a hood, K, in the center of which is a stationary inverted cone, K', which surrounds the shaft h and serves to divert the material outwardly to the walls of the hood, which walls are inclined inwardly and divert the material toward the center. Arms i i' support the cone K' from the hood. The hood and stationary cone form between them a circular trough with openings in its bottom, which openings are the spaces between the arms i, and into this trough rises the gangue or other refuse material. A propeller, L, is mounted upon the shaft h, and has downwardly-projecting wings, which move in the circular trough and discharge the refuse through one or more discharge-spouts, M, extending through the furnace-wall beyond the furnace.

Instead of employing the revolving inverted cone for distributing and separating the material as it rises through the liquid, the regularly-increasing space may be occupied by a series of obliquely-arranged cross-bars, N, which increase in number in an upward direction. These cross-bars may have projections on their lower surfaces. They form the means for separating and distributing the material as it rises, and present a regularly-increasing surface in the direction of movement of the material.

Instead of employing a circular trough into which the refuse rises, a straight trough may be used, which is preferable with the obliquely-arranged plates for distributing and separating the material.

The straight trough is shown in Figs. 2, 6, 7, and 8. Inclined plates O, attached to the walls of the kettle, direct the refuse to the central straight trough, which is formed by the arms k connecting the upper inner edges of the plates O. In this straight trough works a screw-conveyer, P, or an endless chain of scrapers, Q, discharging the refuse into a discharge-spout, M.

It may sometimes be desired to repeat these operations upon the material. For this purpose the kettle has a second scraping-wheel, R, Fig. 2, to the receiving side of which the material is directed by a suitable plate. This wheel is revolved by a second cog-wheel, $f'$, on the shaft $g$. The material is delivered by the feeding-spout C to the receiving side of the first scraping-wheel. By repeating the operation all the metal is extracted from the gangue.

I do not claim the broad idea of buoyant scrapers for immersing the material, since the same is the invention of Walter Hamilton.

What I claim is—

1. In extracting apparatus of the character described, the combination, with the kettle, of an inclined scraping-surface and a revolving scraping wheel or plate having apertures between its scrapers, forming open-bottomed pockets, substantially as set forth.

2. In extracting apparatus of the character described, the combination, with the kettle, of an inclined scraping-surface and a revolving scraping-wheel buoyant in the liquid of the kettle, substantially as set forth.

3. In extracting apparatus of the character described, the combination, with the kettle, and with means for delivering the material at the bottom of the kettle, of distributing or separating devices acting on the material as it rises, having a free space surrounding the same, and having a surface increasing continually in the direction of the movement of the material to the point of discharge, substantially as set forth.

4. In extracting apparatus of the character described, the combination, with the kettle, and with means for delivering the material at the bottom of the kettle, of a revolving inverted cone having a free space surrounding the same, along the surface of which the material rises until it reaches the discharge, substantially as set forth.

5. In extracting apparatus of the character described, the combination, with the kettle, and with means for delivering the material at the bottom of the kettle, of the revolving inverted cone having a free space surrounding the same, and the series of separate annular distributing-plates located in such space near the surface of the cone, substantially as set forth.

6. In extracting apparatus of the character described, the combination, with the kettle, of the stationary cone and inwardly-inclining hood forming between them a circular trough into which the refuse rises, and a discharging-propeller sweeping the refuse from said trough, substantially as set forth.

7. In extracting apparatus of the character described, the combination of a circular discharging-trough into which the refuse rises upon the surface of the material, a single discharge-spout extending from said trough to beyond the furnace, and a horizontally-revolving propeller having blades extending down into the refuse for sweeping the refuse from such surface into said spout, substantially as set forth.

This specification signed and witnessed this 15th day of January, 1884.

JULIUS L. HORNIG.

Witnesses:
BERNARD J. KELLY,
EDWARD H. PYATT.